US012769628B2

(12) United States Patent
Popat et al.

(10) Patent No.: US 12,769,628 B2
(45) Date of Patent: Oct. 20, 2026

(54) PRIVILEGE-FREE CHAOS ENGINE

(71) Applicant: Dell Products L.P., Round Rock, TX (US)

(72) Inventors: Rajiv Popat, Kolkata (IN); Irfan Gilani, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/956,096

(22) Filed: Nov. 22, 2024

(65) Prior Publication Data

US 2026/0147680 A1 May 28, 2026

(51) Int. Cl.
*G06F 11/00* (2006.01)
*G06F 11/263* (2006.01)

(52) U.S. Cl.
CPC .................................. *G06F 11/263* (2013.01)

(58) Field of Classification Search
CPC ..................................................... G06F 11/263
USPC ....................................................... 714/1-57
See application file for complete search history.

(56) References Cited

U.S. PATENT DOCUMENTS

| | | | |
|---|---|---|---|
| 9,898,604 B2 | 2/2018 | Fang et al. | |
| 10,824,726 B1 | 11/2020 | Herman Saffar et al. | |
| 10,866,851 B2 | 12/2020 | Basiri et al. | |
| 10,936,717 B1 | 3/2021 | Herman Saffar et al. | |
| 11,301,350 B1 * | 4/2022 | Byrne | G06F 11/263 |
| 11,356,324 B2 | 6/2022 | Gefen et al. | |
| 11,361,197 B2 | 6/2022 | Calmon et al. | |
| 11,513,935 B2 | 11/2022 | Przestrzelski | |
| 12,259,799 B1 * | 3/2025 | Hornsby | G06F 11/263 |
| 2017/0038984 A1 * | 2/2017 | Manabe | G06F 13/4022 |
| 2018/0103374 A1 * | 4/2018 | Huang | H04L 63/0876 |
| 2019/0340150 A1 * | 11/2019 | Kim | G06Q 50/10 |
| 2021/0092143 A1 * | 3/2021 | Sbandi | H04L 63/1433 |
| 2021/0120010 A1 * | 4/2021 | Chen | H04L 67/145 |
| 2022/0286362 A1 | 9/2022 | Gamliel et al. | |
| 2023/0037124 A1 * | 2/2023 | Mengwasser | H04L 43/50 |
| 2023/0333903 A1 | 10/2023 | White et al. | |
| 2023/0409418 A1 * | 12/2023 | Sood | G06F 11/0709 |
| 2024/0320318 A1 | 9/2024 | Bellam et al. | |
| 2025/0053501 A1 | 2/2025 | Ayyadurai et al. | |
| 2025/0077374 A1 * | 3/2025 | Baker | G06F 11/3414 |
| 2025/0119356 A1 * | 4/2025 | Metwally | H04L 41/145 |
| 2025/0217270 A1 * | 7/2025 | Singh | G06F 11/3688 |

OTHER PUBLICATIONS

Office Action dated Oct. 17, 2025 for U.S. Appl. No. 18/739,558, 9 pages.

(Continued)

*Primary Examiner* — Sarai E Butler
(74) *Attorney, Agent, or Firm* — Daly, Crowley, Mofford & Durkee, LLP

(57) ABSTRACT

A privilege-free chaos engine testing environment is provided. A reverse proxy provided on a communication line between a first resource and a plurality of second resources intercepts communications from the first source intended for the plurality of second resources. Mirror communications (URLs) of the first communication and generated. A chaos scenario is selectively injected into the mirror communication according to a chaos policy to generate a response communication. The response communication is transmitted to the first.

20 Claims, 5 Drawing Sheets

(56) References Cited

OTHER PUBLICATIONS

U.S. Appl. No. 18/473,410, filed Sep. 25, 2023, Mohanty et al.
U.S. Appl. No. 18/739,558, filed Jun. 11, 2024, Rajiv Popat, et al.
Basiri et al., "Automating Chaos Experiments in Production;" Proceedings of 2019 IEEE/ACM 41st International Conference on Software Engineering: Software Engineering in Practice (ICSE-SEIP); May 25-31, 2019; 10 Pages.
Response to U.S. Office Action dated Oct. 17, 2025_for U.S. Appl. No. 18/739,558; Response filed on Dec. 31, 2025; 8 Pages.
Supplemental Response to U.S. Office Action dated Oct. 17, 2025_for U.S. Appl. No. 18/739,558; Response filed on Jan. 15, 2026; 9 Pages.
Notice of Allowance dated Mar. 5, 2026 for U.S. Appl. No. 18/739,558; 5 Pages.

* cited by examiner

PRIVILEGE-FREE CHAOS ENGINE

BACKGROUND

In chaos engineering, instead of trying to shy away from chaos or treating it as an afterthought, the idea of embracing chaos by intentionally injecting chaos into a system is promoted. The idea of anti-fragility (e.g., becoming stronger after encounters with disorder) lays at the foundation of chaos engineering as a discipline. In order to inject chaos, however, chaos engineering products require elevated privileges and special access on data centers to be able to create the intended chaos.

When injecting real chaos, special attention is given to which services are impacted and how many containers, virtual machines, physical machines, or other managed or unmanaged hosting environment of each service are impacted concept often referred to as controlling the "blast radius" of the chaos. An invalid configuration of the blast radius can end up impacting the real users of the system negatively.

Because of the special privileges that are required in production and user acceptance testing (UAT) environments and the fact that chaos engines often take down real production instances, organizations that are embracing chaos engineering require multiple replicas of the production environment and tremendous amount of engineering discipline and rigor to embrace chaos engineering as a practice.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the present disclosure include a testing environment including a chaos engine configured to intercept traffic from a client and inject chaos into the communication without requiring any special rights or privileges on the servers or the data centers where the chaos is being injected. This chaos engine applies the policies of chaos instantly without requiring any configuration change or any restarts.

According to one aspect, a method may include providing a reverse proxy on a communication line between a first resource and a plurality of second resources. A first communication intended for the plurality of second resources may be selectively intercepted from the first resource. A mirror communication of the first communication may be generated. A chaos scenario may be injected into the mirror communication according to a chaos policy to generate a response communication. The response communication may be transmitted to the first resource.

The method may include, alone or in combination, one or more of the following features. The chaos scenario may be injected into the mirror communication requires no rights granted from the plurality of second resources. The chaos scenario may be injected in real-time. The chaos policy may define a blast radius for the chaos scenario. The mirror communication may be a uniform resource locator (URL). The chaos policy may be automatically configured. The chaos policy automatically generated by extracting a plurality of application programming interfaces (APIs) from a plurality of communications from the first resource, generating a plurality of mirror communications from the plurality of APIs, and automatically generating the chaos policy from the plurality of mirror communications. The plurality of second resources may include one or more of a service, a database, and an application. The chaos scenario may include one or more faults. The one or more faults may include one or more of a network error, a connection timeout, a container crashing, and out-of-memory exception, a latency-based delay, a database table deletion, a database deletion, and an application specific error.

According to another aspect, a system may include a memory and at least one processor that is operatively coupled to the memory. The at least one processor may be configured to perform the operations of providing a reverse proxy on a communication line between a first resource and a plurality of second resources. A first communication intended for the plurality of second resources may be selectively intercepted from the first resource. A mirror communication of the first communication may be generated. A chaos scenario may be injected into the mirror communication according to a chaos policy to generate a response communication. The response communication may be transmitted to the first.

The method may include, alone or in combination, one or more of the following features. The chaos scenario may be injected into the mirror communication requires no rights granted from the plurality of second resources. The chaos scenario may be injected in real-time. The chaos policy may define a blast radius for the chaos scenario. The mirror communication may be a uniform resource locator (URL). The chaos policy may be automatically configured. The chaos policy automatically generated by extracting a plurality of application programming interfaces (APIs) from a plurality of communications from the first resource, generating a plurality of mirror communications from the plurality of APIs, and automatically generating the chaos policy from the plurality of mirror communications. The plurality of second resources may include one or more of a service, a database, and an application. The chaos scenario may include one or more faults. The one or more faults may include one or more of a network error, a connection timeout, a container crashing, and out-of-memory exception, a latency-based delay, a database table deletion, a database deletion, and an application specific error.

According to another aspect, a non-transitory computer-readable medium may store one or more processor-executable instructions, which when executed by at least one processor cause the at least one processor to perform the operations of providing a reverse proxy on a communication line between a first resource and a plurality of second resources. A first communication intended for the plurality of second resources may be selectively intercepted from the first resource. A mirror communication of the first communication may be generated. A chaos scenario may be injected into the mirror communication according to a chaos policy to generate a response communication. The response communication may be transmitted to the first resource.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
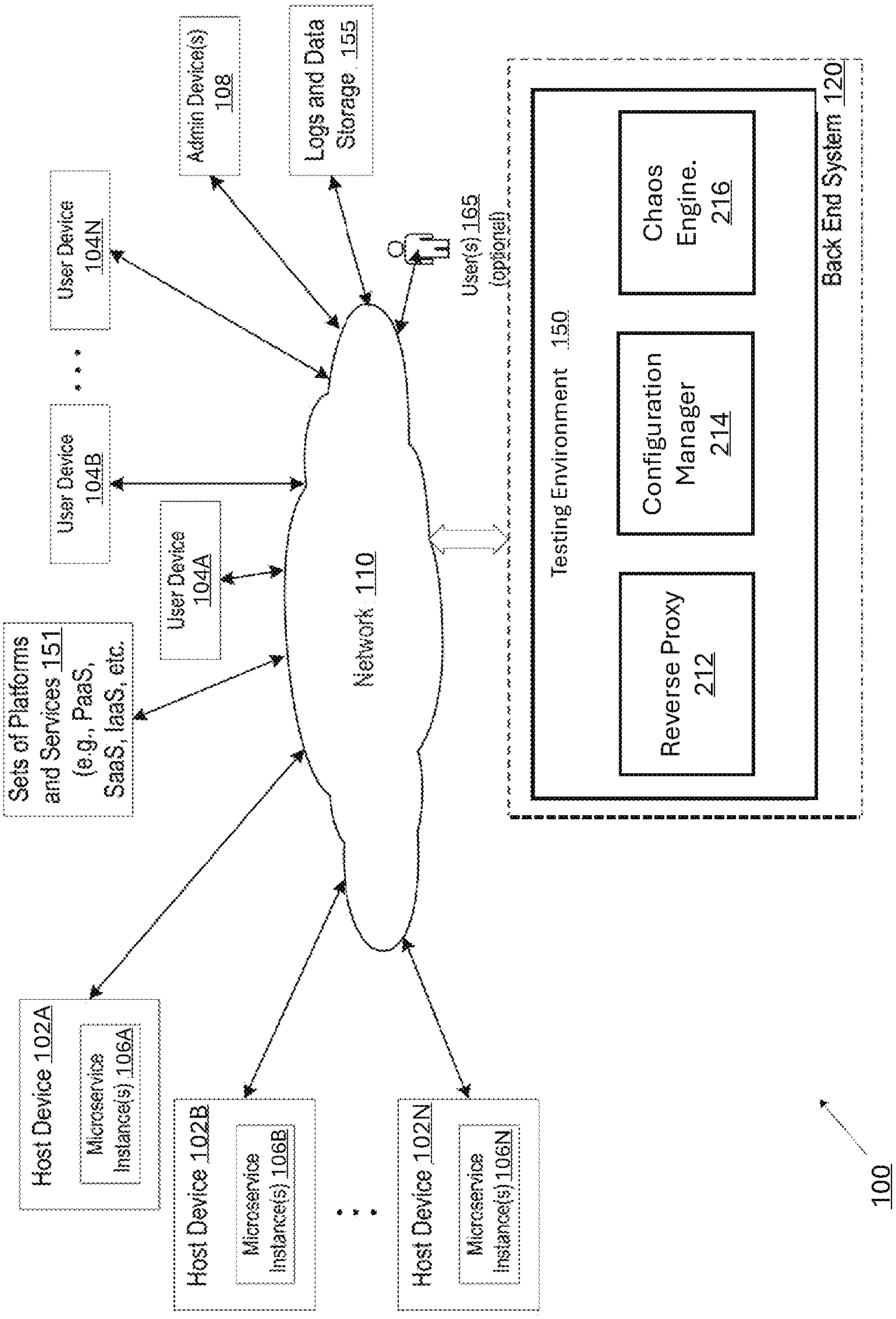
FIG. 1 is an illustration of an exemplary information processing system that includes a testing environment, according to one or more aspects of the disclosure.

Aspects of the present disclosure provide concepts, structures and techniques for implementing a testing environment with a mature chaos engine. The testing environment may introduce chaos into a system without requiring any special rights or privileges on the services, applications or other resources (e.g., data center(s), databases, containers or the like). Aspects of the disclosure, as described herein, may include introducing chaos in real time by intercepting and manipulating traffic (e.g. communications) over a wire (e.g., a network path), creating a virtual blast radius for carrying out chaos tests even in production without impacting any real users, and creating on demand chaos not just for targeted environments but also for specific targeted users or groups of users. A full feedback loop may be used to generate extremely comprehensive chaos reports and also provide fully auto-configuring chaos policies.

Known chaos engines rely on inherent requirements that lead to obstacles in overall adoption and use of chaos engineering practices. For example, in a complex storage system, or database operation, in order to take a container down, special administrative permission is required for the specific host system and sometimes even the data center. Similarly, to take a database instance down, database administrator (DBA)-level privileges are required. Such a requirement hinders the use of chaos engineering since DBAs and system administrators are often reluctant to provide administrative access to development teams.

Further, configuring and picking a blast radius can be daunting task in the world of chaos engineering particularly when the task involves running a chaos test in a real production environment. A slight change in the system configuration can end up impacting real users of the system in negative ways. Given the fact that a blast radius is meticulously hard to control, many organizations and teams that use chaos engineering often start by creating complete replicas of production environments and then doing their chaos tests there. Such a strategy is an expensive proposition and the cost of constantly updating and upgrading that environment to keep it identical to production is a cost in itself.

Because most known chaos engineering products are not hosted in-house, those products not only have access to credentials required to inject chaos and cause damage in their client's systems, they also have a copy of the client's data generated from chaos tests. These tests may show the most vulnerable of microservices running in client's system, showcasing what those vulnerabilities are and which attacks on which microservices will have the highest impact on the client.

The use of known chaos engineering products reveals potential security threats. The fact that credentials are stored with hosted chaos engineering product companies means that any occurrence where the product company is hacked or compromised also means that all companies using them also get hacked or compromised. For example, since these companies are already authorized to generate "real chaos" into their client's environment, a hacker can use the same privilege to drastically enhance the attacks both in terms of magnitude and radius and can take data centers down if such an episode was to occur.

With this backdrop of the obstacles and hindrances in adopting and support chaos engineering policies, aspects of the present disclosure provide tangible and practical systems, methods and applications for implementing fairly complex chaos policies and executing them without requiring any special rights, privileges or permissions from their organization.

FIG. 1 is an illustration of an exemplary information processing system 100 that includes a testing environment 150 in accordance with one embodiment. The information processing system 100 may include a plurality of entities communicating over a computer network 110 with a back end system 120, where the back end system includes the testing environment 150 described herein. The system 100 may also include a plurality of host devices 102A-102N, a plurality of user devices 104A-104N, a plurality of respective microservice 106A-106N running on the plurality of host devices 102A-102N, sets of platforms and service 151 (e.g., PaaS, SaaS, IaaS, etc.) all communicating over a computer network 110 with the back end system 120.

According to one aspect of the disclosure the testing environment 150 may provide the ability to work with a customized chaos engine, as described herein, to create controlled chaotic URLs centrally. As discussed further herein, the testing environment 150 may include a reverse proxy 212, a configuration manager 214, and a chaos engine 216. The reverse proxy, according to one aspect, may serve as a surrogate server appearing to any client to be an ordinary web server. The reverse proxy, however, may act as an intermediary that forwards the client's requests to one or more web servers.

The configuration manager 214, according to one or more aspects, may be configured to allow a user to create new chaos policies manually. The configuration manager 214 may include an intuitive user interface and create various chaos policies. Once created, the policies may be read and loaded in real time and injected into the reverse proxy 212 by, for example the chaos engine 216, so that the reverse proxy 212 can make appropriate modifications to a request or response.

According to one aspect, the chaos engine 216, as described herein, may be configured to intercept traffic from a client and inject chaos over a network or system without requiring any special rights or privileges on the servers or the data centers where the chaos is being injected. The chaos engine 216 may apply the policies of chaos, from for example the configuration manager 214, instantly without requiring any configuration change or any restarts.

According to one or more aspects, the testing environment 150 may operate by intercepting traffic on wire (e.g., being transmitted over a network) and manipulating that traffic to simulate chaos. In this manner, the chaos engine-based testing environment may more easily manage the blast radius of the chaos. For example, if a first service (e.g. Service A) calls a second service (e.g., Service B), neither Service A nor Service B needs to be taken down in order to inject the simulated chaos. The communication between the two services may be intercepted and manipulated in a way that can simulate a large number (e.g., hundreds) of different kinds of real-life chaos. According to one aspect, the types of real-life chaos may include, but are not limited to, network errors, connection timeouts, containers crashing, out of memory exceptions, latency based delayed, database table deletion, entire databases deletion, application specific errors, and the like.

Most every kind of error that known chaos engines introduce is introduced by actually shutting down and/or physically manipulating the containers, infrastructure or database. According to one aspect, the testing environments disclosed herein may produce the same errors, chaos and outcomes by manipulating the communication and the information that flow over the wire. Doing so may drastically reduce pushback or hesitance from IT teams in embracing and implementing chaos engineering, because, as described herein, no special rights or access need to be granted in order to test a system.

Figure 2:
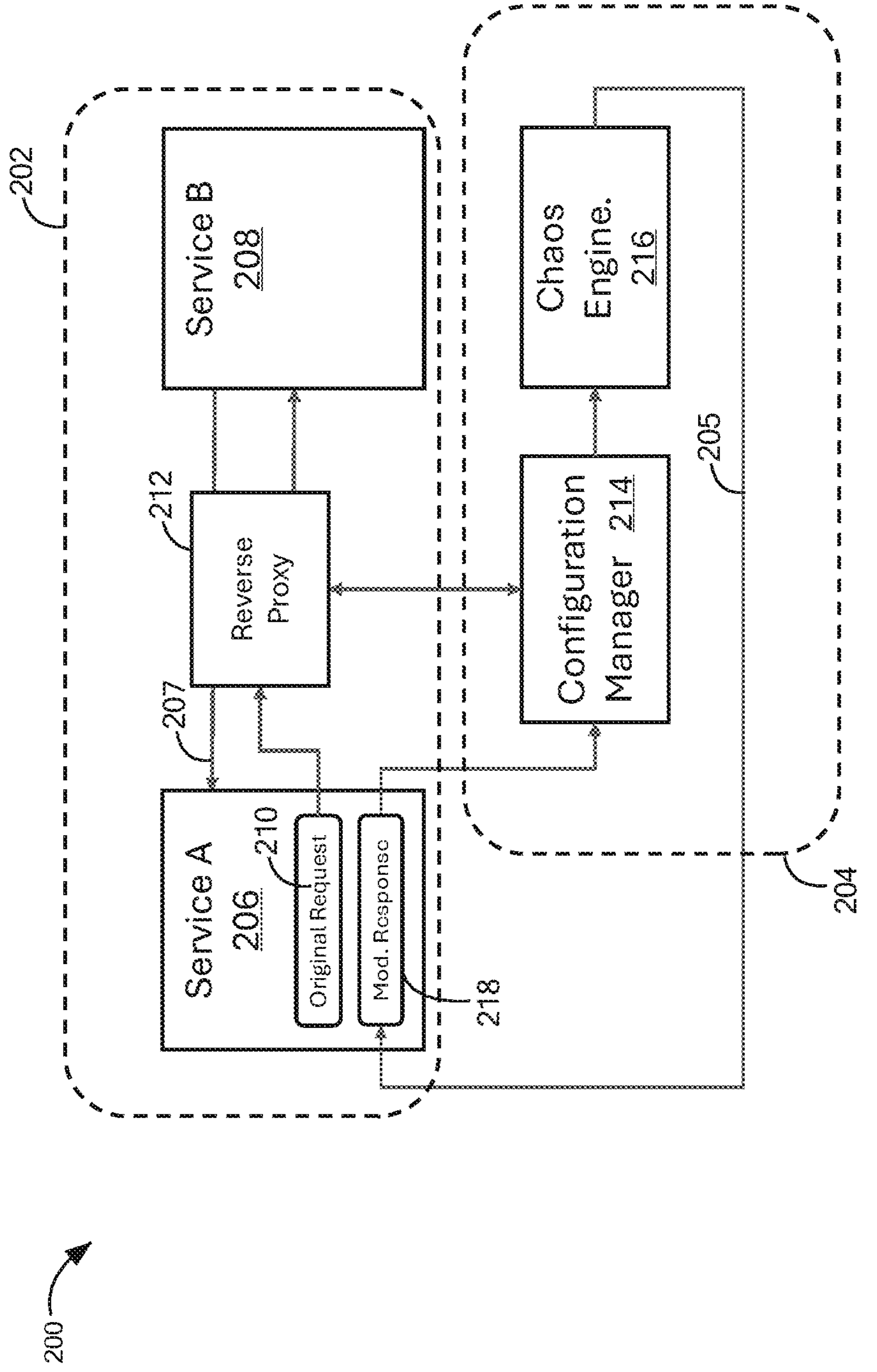
FIG. 2 is a block diagram of an exemplary application and testing environment according to one or more aspects of the disclosure.

FIG. 2 is a block diagram of a testing environment 200 according to one or more aspects of the disclosure. The testing environment may include, for example, a production block 202 and a testing block 204. The production block 202 may include a first service, 206 (e.g., Service A) and a second service 208 (Service B). According to one aspect, the first service 206, such as a client application, may send requests to and receive responses from the second service 208, such as a database or storage system.

While the production block 202 may de described herein in connection with a client application service and a database or storage system service, one skilled in the art will recognize based on the teachings of the present disclosure that the concepts, structures, and techniques may be implemented between any two resources of a system, and that the present disclosure is not limited to only the explicitly identified services.

The testing block 204 may include a configuration manager 214 configured to generate and apply testing scenarios according to a testing policy or the like. A chaos engine may be implemented to inject chaos into a communication, according to the configuration manager 214, to test the response or reaction of the first service 206 when faced with the injected chaos.

According to one aspect, a reverse proxy 212 may be disposed on the network, through which all communications between the first service 206 and the second service 208 may pass. The reverse proxy 212 may be configured to selectively intercept one or more communications intended for the second service 208, such as an original request 210, from the first service 206, and pass the communication to the testing block 204, where the configuration manager 214 may use the chaos engine to inject a chaos scenario including one or more simulated faults into the communication and, as indicated by arrow 205, return a modified response 218 to the first service 206. The first service 206 may respond to the modified "chaotic" response. The testing block 204 and/or configuration manager 214 may observe and record, in a feedback loop, the reaction of the first service 206 to the chaos scenario to determine if the first service 206 appropriately handles the injected faults. In such a manner the testing block 204 can intercept, in real-time, a communication, inject a chaos scenario in the communication and observe how the originating service, the first service 206, handles the scenario. Accordingly, a robust testing scenario may be executed without having to request or receive any special permissions, rights or access to the resources of the second service 208.

According to one aspect, the production block 202 may continue to operate in a normal manner. The reverse proxy 212 may serve, selectively, as a passthrough of a communication, like the original message 210 from the first service 206 to the second service 208. The second service 208 may generate a response and return it to the first service, indicated by arrow 207, in the course of a normal operation.

According to one aspect, the testing environment may combine a customized reverse proxy with a custom chaos engine. This combination may allow a testing system to snoop into all traffic that flows through the wire (e.g., network) before it reaches a destination service. The combination may also allow the system to snoop into the responses that are being sent back from the services (e.g. Service B) to the clients (e.g., Service A). Having access to the data on the wire allows the system to manipulate, modify, and even disrupt both requests and responses over any communication protocol (i.e., not just HTTP). Accordingly, the system may create as much damage and chaos, both at the application layer, and in certain cases the infrastructure layer, as someone who has full access to the infrastructure.

Some known chaos simulators inject chaos by injecting code at the individual micro service or micro front end level, but doing so requires consumption of those nuggets and libraries into the code and the underlying code and configuration of the application has to undergo change. Aspects of the present system, however, use a chaos engine and reverse proxy bundled as a single unit to create a centralized chaos generation factory that does not require the applications where the chaos is to be applied to undergo any change. Accordingly, the concepts, structures and techniques of the present disclosure are able to generate chaos without requiring any changes on the datacenter; without requiring any change on the caller; and without requiring any change on the application being called. Additionally, such chaos may be generated enterprise wide.

Figure 3:
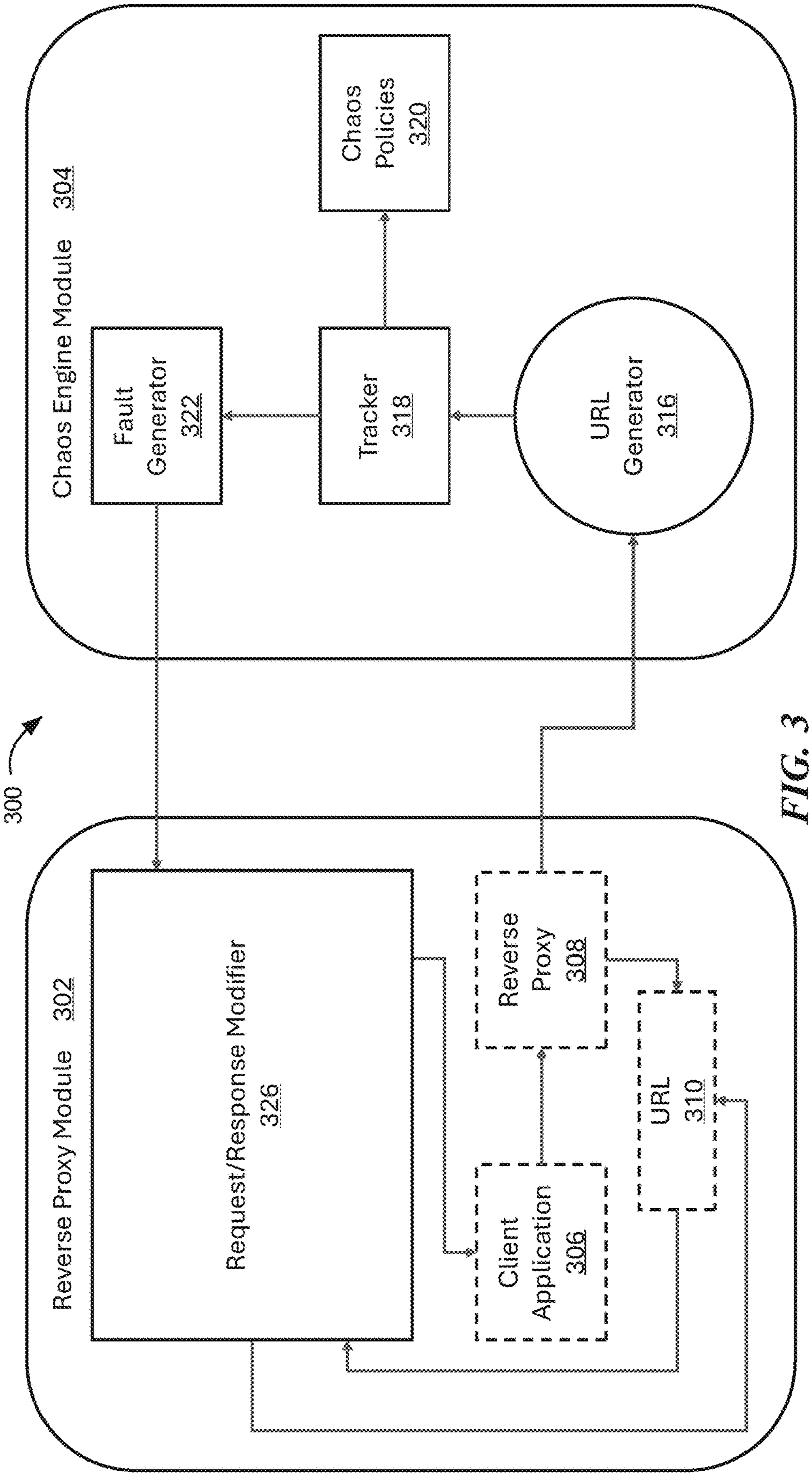
FIG. 3 is a diagram of a testing architecture 300 according to one or more aspects of the present disclosure.

FIG. 3 is a diagram of a testing architecture 300 according to one or more aspects of the present disclosure. A reverse proxy module 302 and a chaos engine 304 may work in conjunction to intercept communications, for example a URL 310, from a service, like client application 306 and modify the communication by injecting one or more generated faults. The URL may be returned, as a response URL for example, to the client application 306 in order to observe its response to the injected chaos.

According to one aspect, the reverse proxy module 302 may include or communicate with a reverse proxy 308, a response/request modifier 326. The chaos engine module 304, according to one aspect, may include or communicate with a URL generator 316, a tracker 318, one or more chaos polices 320 and a fault generator 322. One skilled in the art will recognize that the modules and other components shown in FIG. 3 are described in connection with the reverse proxy module 302 and chaos engine module 304 for purposes of explaining the operational and structural aspects of the system and the arrangement of such components is not limited, physically or otherwise, to the depiction of FIG. 3. For example, the response interceptor 312 and request interceptor 324 may be included as one module. Similarly, the request modifier 326 and the request interceptor may be included as one module.

According to one aspect, the client application may send a communication, for example a URL indicated at arrow 352, intended for a one or more resources, such as a service, database, or the like. The reverse proxy 308 may receive the request and determine if the chaos engine 304 is enabled. If the chaos engine 304 is not enabled, the reverse proxy 308 may transmit the URL to the intended resource (not shown). If on the other hand, the chaos engine 304 is enabled, the reverse proxy 308 may transmit the URL to the chaos engine 304 and a URL generator 316.

As an entry point into the chaos engine, according to one aspect, the URL generator may consult a chaos policy 320 generate a virtual chaotic URL corresponding to the original service's URL, for example a mirror communication or URL. The URL generator may automatically set a virtual radius of chaos that is limited to the URL. In some cases, the URL generator may be configured to update the reverse proxy 308 such that the client application 306 points to chaotic mirror URLs in some cases and regular ones in other cases. While the URL generator 316 may adopt or implement a selective chaos policy (e.g., determining a portion of the URL communications to which chaos is injected), the chaos engine 304 itself also has passthrough capabilities. In such a manner, whenever the chaos engine 304 is not enabled, the chaos engine 304 itself may start functioning as a pure reverse proxy. According to one aspect, a user interface may be provided in which the chaos engine 304 may be toggled between 'on' and 'off'.

According to one aspect, the URLs intercepted at the reverse proxy and converted to mirror chaotic URLs may be generated on the fly in real time. Accordingly, the chaos engine 304 may be capable of creating mirror URLs for all traffic going through the proxy 308 and/or from Splunk logs, as described below, to automatically update centralized configuration sources to point to the mirror URLs instead of the original, actual URLs. According to one aspect, the reverse proxy module 302/chaos engine 304 may be deployed once at an organizational level and eventually will be able to determine an API ecosystem, configure itself, inject chaos and automatically evolve its own configuration without requiring any rights, admin or otherwise, and any manual configuration.

According to one aspect, a tracker 318 may be implemented to track policies 320 and their usage as injected. For example, chaos policies 320 themselves may be complex and may contain a collection of staggered chaos to be injected into the system. The tracker 318 may record and track the occurrences of these chaos injections. For example, a chaos policy 320 might state that for 10% of the time the service should experience a latency of 100 seconds where else for another 20% of the time it should see a latency of 10 seconds. For 5% of the time the service should experience an internal server error and for another 5% of the time, the database itself should go down. In case of such complex staggered policies, the chaos policy tracker 318 may track, on a per client basis, the requests received, and the responses being given out to consistently produce outcomes which match the defined chaos policy.

One of skill in the art will recognize that the number of potential chaos policies and combination of staggered faults, errors, conditions, and the like, is limitless. As but one additional example, a chaos policy 320 may be generated and/or implemented to cause a 10 second latency delay for 50% of the communications, while the other 50% of the time the service returns an internal server error.

According to one aspect, the fault generator 322 may read the chaos policy 320 and generate one or more simulated faults to inject into the communication to be returned to the client application 306. Accordingly, the fault generator may generate HTTP Responses, non-HTTP Responses, errors, faults, exceptions, latency delays, timeouts and other real-world chaos events and exceptions. According to one aspect, the faults may only be generated if the application URL's chaos setting is toggled on. The fault generator 322 may be configured to work not only on the HTTP layer, but it can additionally target any protocol and front end product to inject chaos as per the policy 320 configuration.

The request/response modifier 326, according to one aspect, may be used by the reverse proxy module 302 to snoop at any incoming request (e.g., over HTTP or any other protocol) and modify it on the fly. The request/response modifier 326 may receive requests and responses and modify them according to the chaos to be selectively injected. The request/response modifier 326 may work with the fault generator 322 to generate real HTTP response-based faults, exceptions, latency delays, timeouts and other real-world errors. Alternatively, the request/response modifier 326 may serve as a passthrough if no chaos is to be injected into the communication.

According to one aspect, the intricate weaving of the components shown conceptually in FIG. 3 provides a testing environment which can effectively and meaningfully produce chaos without requiring any specialized privileges on the data centers or servers. Further, no code change on the actual micro services is necessary. The generation of fresh chaotic mirror URLs on the fly allows the system to inject the virtual simulation of chaos even for third party services and in cases where there is no access to source code for the involved systems.

Figure 4:
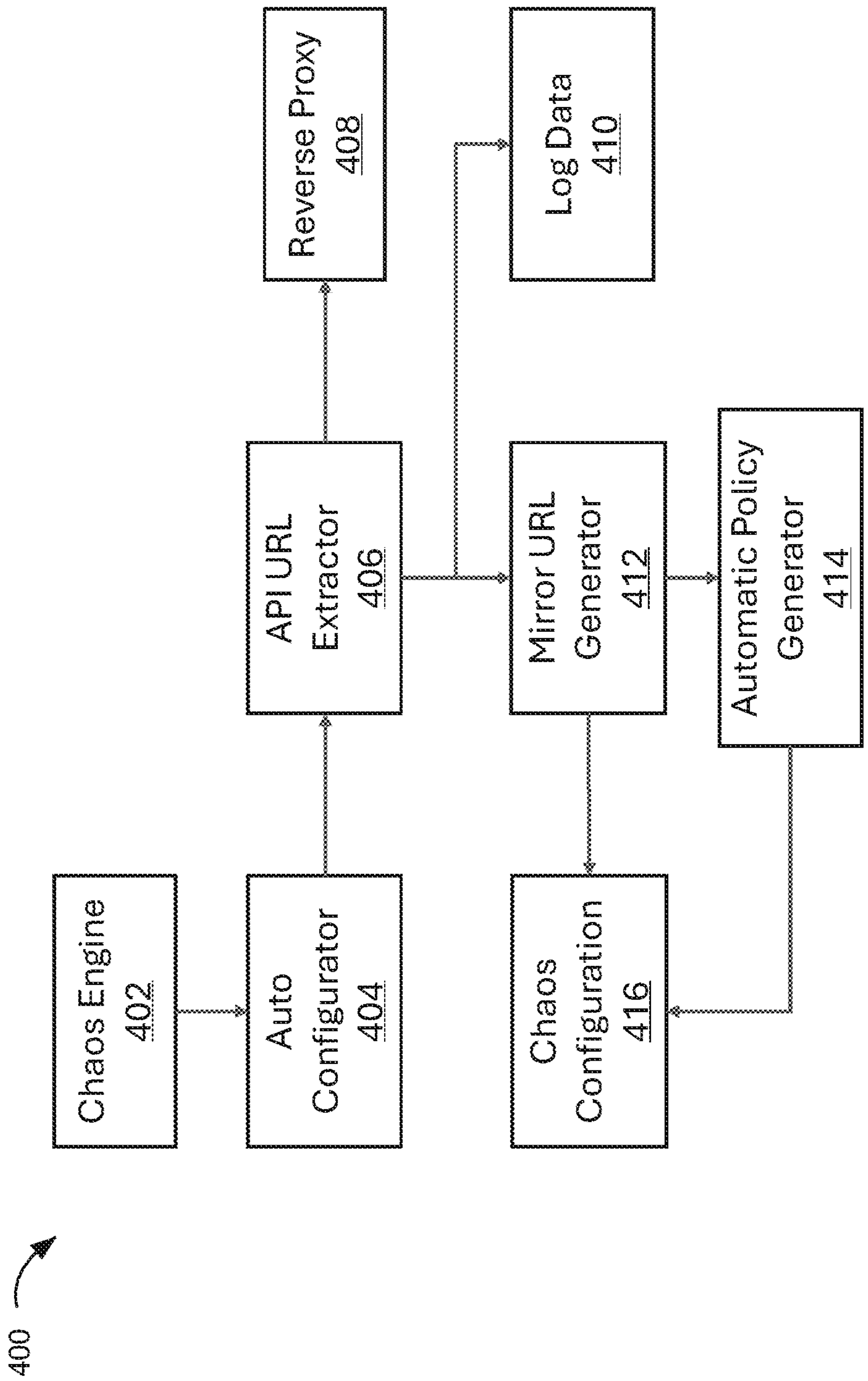
FIG. 4 is a flow diagram of an automatic configuration of a chaos engine according to one or more aspects of the disclosure.

Turning now to FIG. 4, a flow diagram of an automatic configuration 400 of a chaos engine is shown, according to one or more aspects of the disclosure. As described herein, the implementation and use of the testing environment does not require any special rights privileges or configuration to implement it within an enterprise. According to one aspect, once installed, the chaos engine may figure out the kind of chaos that should be injected in each of the micro services using artificial intelligence and/or machine learning automatically, without any manual configuration. The automatic configuration of the chaos policies may be accomplished according to the teachings and disclosures in commonly assigned U.S. patent application Ser. No. 18/739,558, filed on Jun. 11, 2024, and entitled "Centralized Smart Self-Configuring Chaos Policies and Experiments," the content of which is hereby incorporated by reference in its entirety.

According to one aspect, the testing environment systems described herein may be configured to intercept all traffic going through an organizational reverse proxy and/or Splunk to analyze and extract which application programming interfaces (APIs) exist in the organizational eco system. According to one aspect, by examining the traffic over the wire and the log streams stored in Slunk, the system may "reverse-engineer" which API URLs exist in the ecosystem, without the intervention, permission or access from the organization.

Given the chaos engine requires no additional rights or privileges, the system may be configured to automatically generate mirror URLs. Given that most organizations today centralize configuration using a third-party application or service, if the centralized configuration source is provided, the system may automatically replace original URLs with generated mirror URLs in the centralized configuration source. According to one aspect, by default, the mirror URLs may have chaos disabled, however, as the chaos engine learns more about the kind of errors that the API has in production it may automatically enable and start injecting chaos into the system.

As shown in FIG. 4, the chaos engine 402 may start the autoconfiguration process with an auto-configurator 404. The auto-configurator 404 may include three roles. The first may be to discover new API routes and mirror the routes using chaotic mirror URLs with no chaos injected, as described herein. A second role may include automatically generating chaos and injection rate. The third role may include automatically removing chaos injection when any issues identified are fixed, for example by a development team. For these three it uses the underlying components shown in the diagram above.

According to one aspect, an API URL extractor 406 may have access to reverse proxy access logs and may be able to create a list of all API end points at an organizational level that pass through the reverse proxy 408. If an organization is not using reverse proxy, according to one aspect, the API URL extractor 406 can also parse log data 410 to create the list based on, for example, Splunk calls. In such a manner, all calls that access JSON request and response and return web-based responses (e.g. 200 OK) may be potential candidates for extraction.

The mirror URL generator 412 may, as described herein generate mirror ULRs for the selective injection of chaos. The mirror URL generator 412 may be the same as or similar to the URL generator 316 shown in FIG. 3. An automatic policy generator, like that described in U.S. patent application Ser. No. 18/739,558, filed on Jun. 11, 2024, and entitled "Centralized Smart Self-Configuring Chaos Policies and Experiments," incorporated by reference herein, may use the generated mirror URLs to generate one or more chaos policies for implementation. The policies and the mirror URLs may be written to a chaos configuration that can be implemented, monitored and maintained as described herein.

As described herein, the concepts, structures and techniques provide a testing environment that can generate chaos without requiring any special rights or privileges. Such a feature reduces resistance from the teams implementing and embracing chaos engineering as a mechanism to test a system.

According to one aspect, the chaos injected into the engine may affect instantly without having to push any new policies, update any configuration files or having to restart any servers. As the engine works by inspecting data and requests over the wire and then manipulating them to inject chaos, any chaos policy injected may have an instant impact and, importantly, no configuration changes or restarts are required.

According to another aspect, the chaos policies generated and implemented herein may require neither the application server nor the reverse proxy to be restarted. Accordingly, the system can also be pre-configured with chaos along with the date and time in future when this chaos should be triggered. This allows the system to automatically schedule chaos between specific time ranges of the day if we want to without any human intervention.

As detailed herein, controlling the blast radius of any chaos engine presents a challenge. Any mistakes in the configuration can end up impacting real users. Aspects of the present disclosure provide the ability to instantly generate mirror URLs of production instances (without requiring any new infrastructure. The mirror chaotic URLs are able to the blast radius since any misconfiguration on the chaos engine is limited to this virtual radius and does not go beyond these chaotic URLs. According to one aspect, the blast radius can be further tweaked and can be assigned rules for certain users (user based) or generic rules such as those systems having specific cookie on their machine (rules-based). This can also lead to on demand chaos tests.

Known methods of chaos testing in most organizations are a timed affair. The infrastructure team may need to be made aware; the swat teams may have to be informed, and preparation work is required so as to not raise false alarms in the enterprise. Aspects of the present disclosure provide for the ability to conduct on demand chaos tests using rules. The feedback loop from these tests and tagged logs can ensure that swat teams can easily separate real logs from logs generated using chaos tests and a comprehensive report can be generated.

Aspects of the present disclosure provide a solution that only requires a singular installation in the enterprise with connections to the enterprise reverse proxy, log stream (Splunk) and configuration source. Accordingly, the system may create chaotic URLs automatically, inject chaos automatically and even update its configuration periodically without requiring any human intervention.

Figure 5:
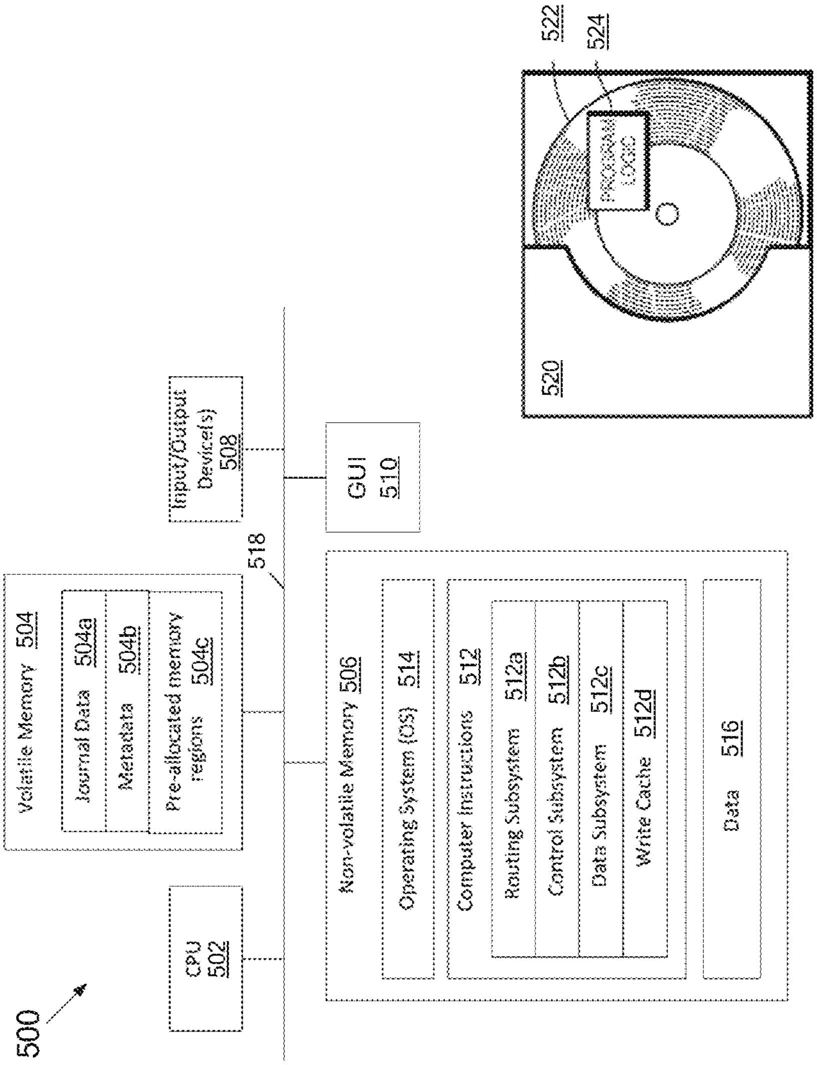
FIG. 5 is a block diagram of an exemplary computer system usable with at least some of the systems, methods, examples, and outputs of FIGS. 1-4, according to one or more aspects of the disclosure.

In certain embodiments, at least some embodiments herein are implemented using a computer system. For example, FIG. 5 is a block diagram of an exemplary computer system 500 usable with at least some of the systems, methods, examples, and outputs of FIGS. 2-6 in accordance with one embodiment. As shown in FIG. 5, computer system 500 may include processor/central processing unit (CPU) 502, volatile memory 504 (e.g., RAM), non-volatile memory 506 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 510 (e.g., a touchscreen, a display, and so forth) and input and/or output (I/O) device(s) 508 (e.g., a mouse/keyboard, a camera, a microphone, speakers and optionally other custom sensors that provide user input, such as biometric sensors, accelerometers, position sensors, etc.). A bus 518 interconnects the CPU 502, volatile memory 504, non-volatile memory 506, GUI 510, and I/O devices 508.

Non-volatile memory 506 stores, e.g., journal data 504*a*, metadata 504*b*, and pre-allocated memory regions 504*c*. The non-volatile memory, 506 can include, in some embodiments, an operating system 514, and computer instructions 512, and data 516. In certain embodiment, the non-volatile memory 506 is configured to be a memory storing instructions that are executed by a processor, such as processor/CPU 502. In certain embodiments, the computer instructions 512 are configured to provide several subsystems, including a routing subsystem 512A, a control subsystem 512*b*, a data subsystem 512*c*, and a write cache 512*d*. In certain embodiments, the computer instructions 512 are executed by the processor/CPU 502 out of volatile memory 504 to implement and/or perform at least a portion of the systems and processes shown in FIGS. 1-4. Program code (e.g., computer program code) also may be applied to data entered using an input device or GUI 510 or received from I/O device(s) 508.

The systems, architectures, and processes of FIGS. 2-4 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the methods discussed herein may be embodied as part of the computer system 500 described in FIG. 5. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor/CPU 502 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of computer program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, universal serial bus (USB) drives, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium (e.g., a non-transitory computer readable storage medium) and the computer program code is loaded into and executed by a machine, such as a computer, the machine becomes an apparatus for practicing the method.

When implemented on one or more processing devices, the computer program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the computer program code is loaded into and executed by a machine, such as the computer of FIG. 7, the machine becomes an apparatus for practicing one or more of the described embodiments. When implemented on one or more general-purpose processors, the computer program code combines with such a processor to provide a unique apparatus that operates analogously to specific logic circuits. As such a general-purpose digital machine can be transformed into a special purpose digital machine. FIG. 7 shows Program Logic 724 embodied on a computer-readable medium 720 as shown, and wherein the Logic is encoded in computer-executable code thereby forms a Computer Program Product 722. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

FIGS. 1-5 are provided as an example only. In some aspects or embodiments, the term "I/O request" or simply "I/O" may be used to refer to an input or output request. In some embodiments, an I/O request may refer to a data read or write request. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term "vector" refers to a sequence of numbers (and/or other elements). The phrase "the element having index i" refer to the i-th element in the sequence. For example, if i=1, the phrase i-th element in the sequence would refer to the first element in the sequence, if i=2, the phrase i-th element in the sequence would refer to the second element in the sequence, and so forth.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method comprising:

providing a reverse proxy on a communication line between a first resource and a plurality of second resources;

selectively intercepting a first communication from the first resource intended for the plurality of second resources;

generating a mirror communication of the first communication;

injecting a chaos scenario into the mirror communication according to a chaos policy to generate a response communication; and transmitting the response communication to the first resource.

2. The method of claim 1 wherein the chaos scenario is injected into the mirror communication requires no rights granted from the plurality of second resources.

3. The method of claim 1 wherein the chaos scenario is injected in real-time.

4. The method of claim 1 wherein the chaos policy defines a blast radius for the chaos scenario.

5. The method of claim 1 wherein the mirror communication is a uniform resource locator (URL).

6. The method of claim 1 further comprising automatically configuring the chaos policy.

7. The method of claim 6 wherein automatically generating the chaos policy comprises:

extracting a plurality of application programming interfaces (APIs) from a plurality of communications from the plurality of second resources;

generating a plurality of mirror communications from the plurality of APIs; and automatically generating the chaos policy from the plurality of mirror communications.

8. The method of claim 1 wherein the plurality of second resources includes one or more of a service, a database, and an application.

9. The method of claim 1 wherein the chaos scenario includes one or more faults.

10. The method of claim 9 wherein the one or more faults include one or more of a network error, a connection timeout, a container crashing, and out-of-memory exception, a latency-based delay, a database table deletion, a database deletion, and an application specific error.

11. A system comprising:

a memory; and at least one processor that is operatively coupled to the memory, the at least one processor being configured to perform the operations of:

providing a reverse proxy on a communication line between a first resource and a plurality of second resources;

selectively intercepting a first communication from the first resource intended for the plurality of second resources;

generating a mirror communication of the first communication;

injecting a chaos scenario into the mirror communication according to a chaos policy to generate a response communication; and transmitting the response communication to the first resource.

12. The system of claim 11 wherein the chaos scenario is injected into the mirror communication requires no rights granted from the plurality of second resources.

13. The system of claim 11 wherein the chaos scenario is injected in real-time.

14. The system of claim 11 wherein the chaos policy defines a blast radius for the chaos scenario.

15. The system of claim 11 wherein the mirror communication is a uniform resource locator (URL).

16. The system of claim 11 further comprising automatically configuring the chaos policy.

17. The system of claim 16 wherein automatically generating the chaos policy comprises:

extracting a plurality of application programming interfaces (APIs) from a plurality of communications from the first resource, generating a plurality of mirror communications from the plurality of APIs; and automatically generating the chaos policy from the plurality of mirror communications.

18. The system of claim 11 wherein the plurality of second resources includes one or more of a service, a database, and an application.

19. The system of claim 11 wherein the chaos scenario includes one or more faults, wherein the one or more faults include one or more of a network error, a connection timeout, a container crashing, and out-of-memory exception, a latency-based delay, a database table deletion, a database deletion, and an application specific error.

20. A non-transitory computer-readable medium storing one or more processor-executable instructions, which when executed by at least one processor cause the at least one processor to perform the operations of:

providing a reverse proxy on a communication line between a first resource and a plurality of second resources;

selectively intercepting a first communication from the first resource intended for the plurality of second resources;

generating a mirror communication of the first communication;

injecting a chaos scenario into the mirror communication according to a chaos policy to generate a response communication; and transmitting the response communication to the first resource.

* * * * *